United States Patent [19]

Harrison

[11] Patent Number: 4,951,168
[45] Date of Patent: Aug. 21, 1990

[54] TRANSFORMERS HAVING OVERLOAD PROTECTION

[76] Inventor: Herman A. Harrison, 6132 Springdale Rd., Cincinnati, Ohio 45247

[21] Appl. No.: 354,488

[22] Filed: May 19, 1989

[51] Int. Cl.$^5$ .............................................. H02H 7/04
[52] U.S. Cl. ....................... 361/35; 361/37; 361/38; 361/104; 361/105; 336/144; 336/219
[58] Field of Search ............ 361/11, 37, 38, 58, 361/104, 35, 105; 336/144, 179, 146, 198, 219

[56] References Cited

U.S. PATENT DOCUMENTS

| | | | |
|---|---|---|---|
| 2,776,855 | 3/1942 | Meador | 361/38 |
| 3,532,934 | 10/1970 | Ballman | 361/37 |
| 3,611,034 | 10/1971 | Astleford, Jr. et al. | 361/37 |
| 3,700,965 | 10/1972 | Tone | 361/38 |
| 4,053,938 | 10/1977 | Estes | 361/37 |

Primary Examiner—Todd E. Deboer
Attorney, Agent, or Firm—Kinney & Schenk

[57] ABSTRACT

A 60 VA transformer is described. A recycling circuit breaker mounted on and connected in series with the secondary winding of the transformer preserves the integrity of the transformer and permits its continued use after a short circuit. A thermal fuse mounted on and connected in series with the primary winding provides short circuit protection in the event the circuit breaker fails in a closed position. Achievement of this end is attained by decoupling the transformer windings to reduce short circuit, secondary current flow. Decoupling is provided by spacing the transformer windings a distance of about 0.090 in. A controlled failure mode provides energy limiting protection for the secondary load circuit in the event of circuit breaker failure in the closed position. Controlled failure is provided by the use of secondary insulation which melts within one minute of a short circuit, permitting turns of the secondary winding to short and reduce current flow to eight amp. within the one minute period. In a second embodiment the thermal fuse and the recycling circuit breaker are both mounted on and connected in series with the primary winding. Shunt plates also increase decoupling of the windings so that short circuit current flow does not exceed eight amp.

16 Claims, 3 Drawing Sheets

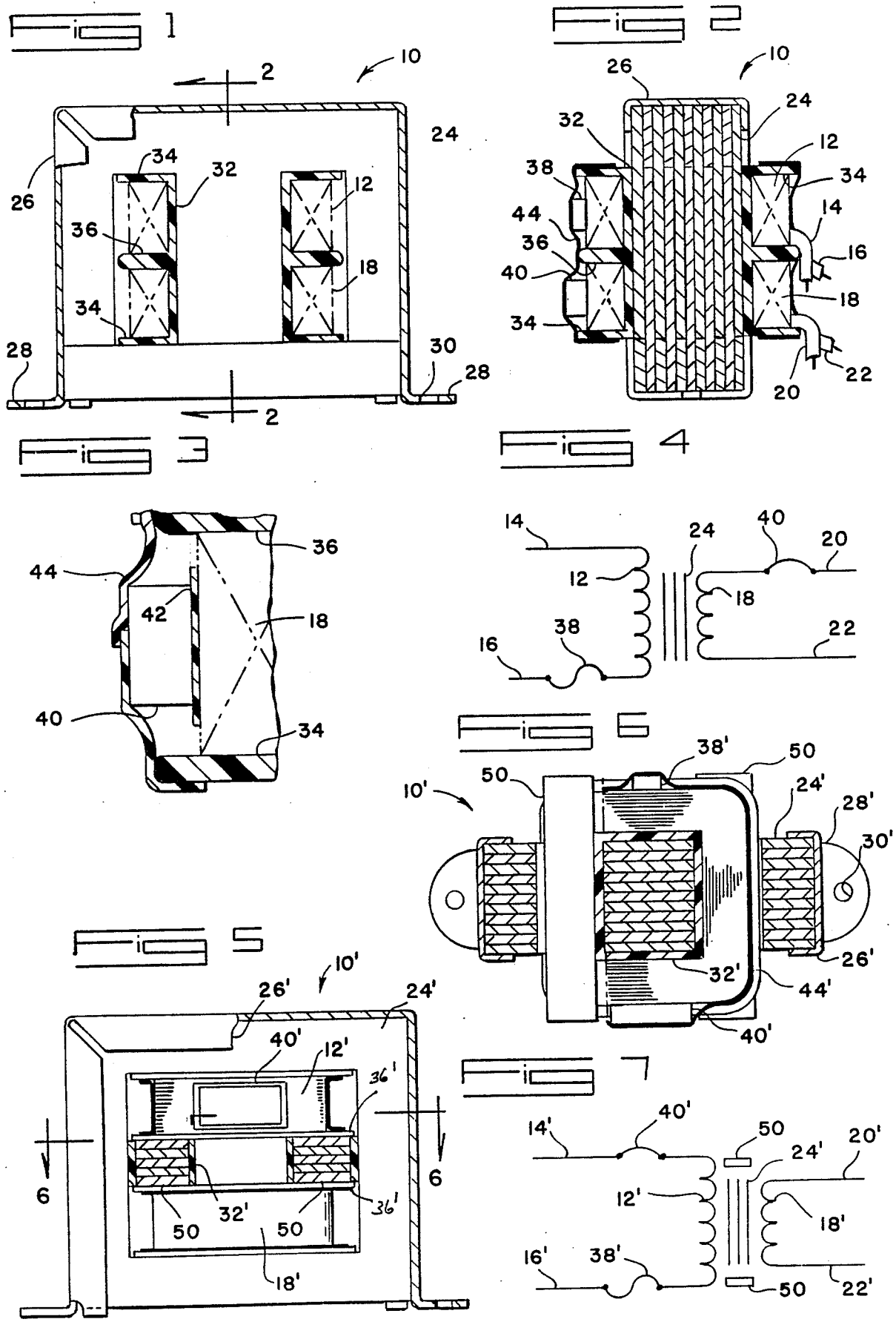

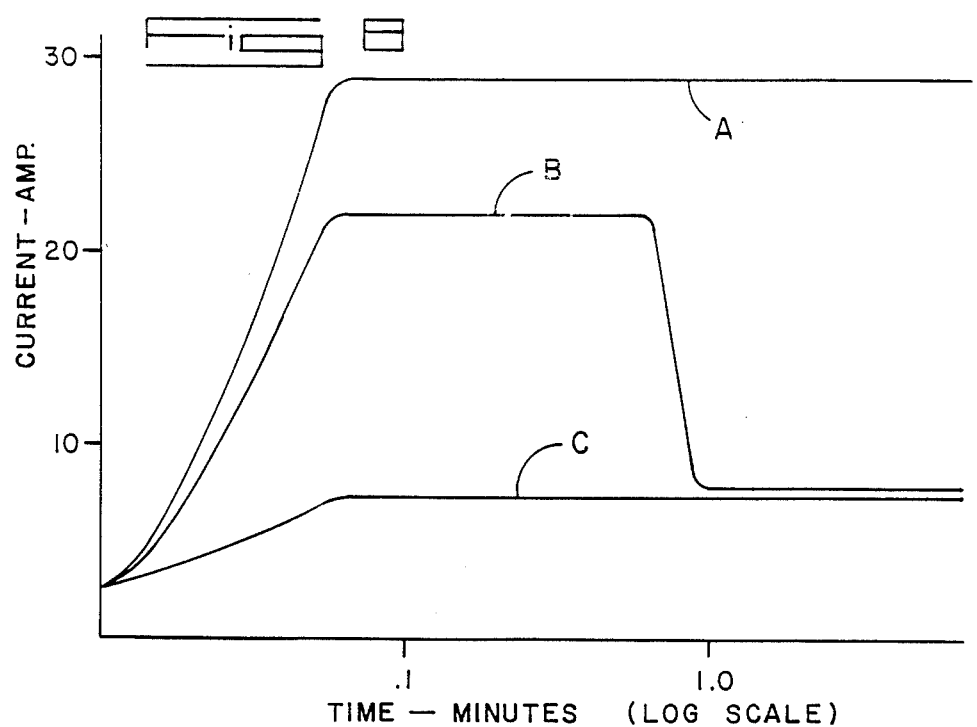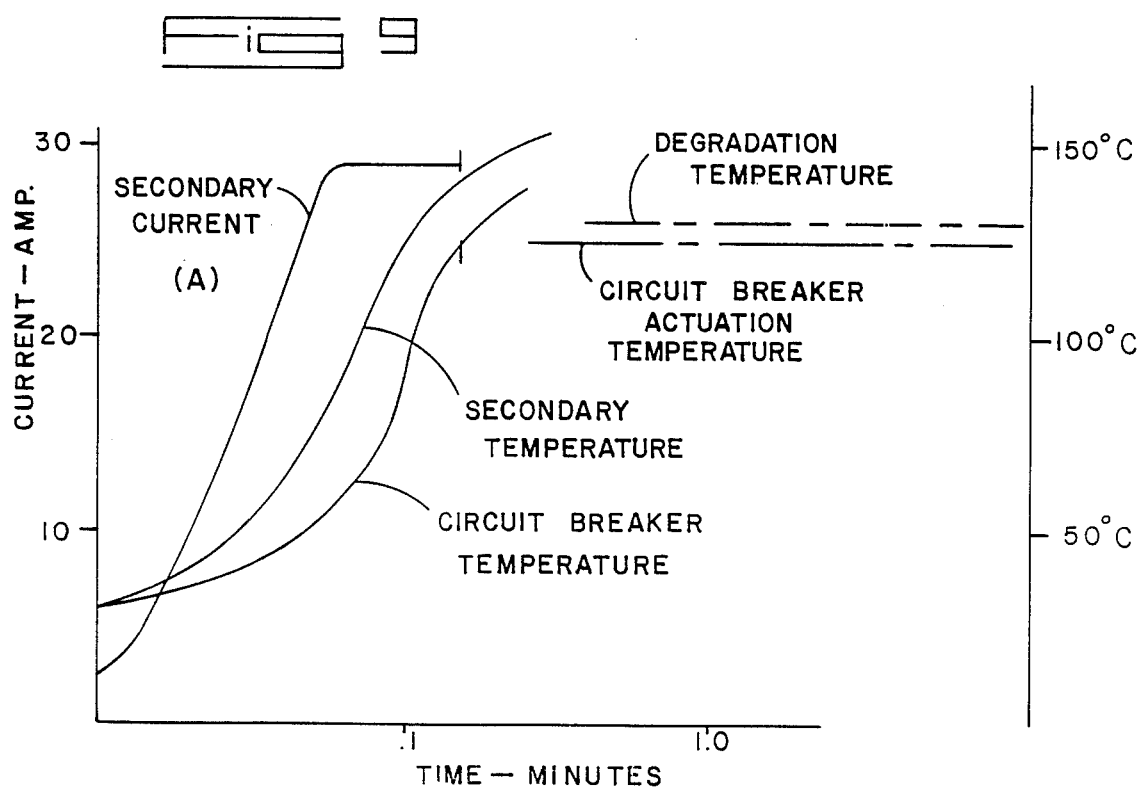

TRANSFORMERS HAVING OVERLOAD PROTECTION

The present invention relates to improvements in transformers and more particularly to improved overload protection therefor.

Transformers are well known electrical devices which comprise primary and a secondary windings. The primary is connected across a power source and an electrical load is connected across the secondary. The usual function of a transformer is to obtain, from the secondary, an output potential which is higher or lower than the potential of the power source. Transformers also, inherently, isolate the electrical load from the power source and, at times, are used for that reason alone.

Although not so limited, the present invention is motivated by a desire to minimize costs in the maintenance of heating and air conditioning systems and in other transformer applications where similar conditions exist.

In these systems, transformers are employed to provide non lethal electrical control power for thermostats, solenoids, etc., which regulate operation of the system. It is generally accepted that a potential of 30 volts (rms) or less is non lethal and the output of control transformers is generally that or less than that.

Because the energy ratings of control transformers are relatively small, the circuit breakers and fuses of conventional branch circuits, do not provide adequate protection against overloads, or overcurrent flow, in the secondary load of a transformer. For this reason, various code requirements and standards have been established for transformer overload protection.

One approved method of providing overload protection is the use of a fuse in series with the primary winding. The fuse may be either current limiting or thermally responsive to the temperature of the primary winding. With either type fuse, an overload in the secondary results in actuation of the fuse and deenergizing of the secondary winding before the energy of the overload reaches a level where a hazardous condition is created.

Another requirement for this type of transformer overload protection is that the fuse be inaccessible, or means otherwise provided which prevent the fuse from being bypassed and its protective function defeated. Thus, once there has been an overload which actuates the fuse, the transformer must be replaced.

While this overload protection is highly effective, it causes unduly high costs in the maintenance of systems in which the transformers are incorporated.

The need to replace a transformer each time an overload occurs represents a great expense, not only in the cost of the replacement transformer, but for other reasons as well. In most cases it requires the expense of a service man to come to the site of the system. In many instances, the service man will not have a replacement transformer at hand and must make a second call when it is obtained. In addition to these expenses there is the inconvenience, if not loss of production caused by the downtime of the system in which the transformer is incorporated.

To compound these problems, a significant portion of transformer replacements are for causes other than a circuit malfunction. Thus, for example, during installation of a control system, the circuit can be inadvertently energized at a time when the leads of a transformer are in contact with a duct.

Another cause of transformer failure can be an increase in the ambient operating temperature. In such case, particularly with a thermal fuse, transformer replacement can be required by the temperature rise caused by normal operating currents which elevate the temperature of the winding above the rated temperature of the fuse.

To a limited extent, these problems have been recognized and partially solved through the use of recycling circuit breakers. These are commercially available devices which comprise a bimetallic element. When the temperature of the recycling circuit breaker exceeds a rated value, the bimetallic element flexes to open a set of contacts and interrupt current flow. When the circuit breaker cools below the rated temperature, the bimetallic element flexes back to a position in which the contacts are closed and current flow is reestablished.

Recycling circuit breakers have been provided in series with the secondary windings of transformers. With a temperature rating below the degradation temperature of the insulation of the secondary winding, such circuit breakers do provide effective overload protection, with the transformer otherwise being maintained in a serviceable condition. Further, since they automatically recycle to a closed position, when cooled, the transformer is returned to an operable condition and the need for its replacement eliminated. If the cause of the overload condition has been corrected, the control circuit returns to normal operation, in many cases without even the need of the expense of a service man making a service call.

Unfortunately, the advantages of recycling circuit breakers have been limited to transformers having relatively low power ratings, generally in the order of 30 VA or less.

There are two reasons for this limitation. First, in transformers having a power rating of about 40 VA and above, the high level of short circuit current flow in the secondary winding degrades its insulation before the circuit breaker can actuate. This is to say that, where there is a short circuit in the secondary load circuit, current flow is limited, primarily, by the impedance of the secondary winding. In lower power transformers this impedance is high enough to limit current flow to a level whereat the temperature rise in the secondary winding can be sensed by the circuit breaker and current flow interrupted before degradation of the insulation occurs. In higher power rated transformers, this impedance is lower and short circuit current magnitude is so high that heat generated in the winding will be above the insulation, degradation temperature before that temperature rise will be sensed by the circuit breaker to interrupt current flow.

The second reason that recycling circuit breakers have not been used for as protective devices for transformers of higher power ratings is a further regulatory requirement that the transformer must be energy limiting when used with a circuit breaker. The energy limiting requirement has for its purpose the protection of components in the load circuit in the event there is a short circuit when the circuit breaker has failed in a closed position. Under such circumstance, again, current flow would be limited only by the impedance of the secondary winding, or the impedance of the winding and whatever electrical component might remain in series with the ground connection. In any event, short circuit current flow generates energy which can create a hazardous condition.

The relatively high impedance of the secondary windings of transformers having power ratings of about 30 VA or less, also serves this energy limiting function, which, by an established standard, must be a current flow of 8 amp. or less within one minute of the occurrence of a short circuit. Transformers having power ratings of about 40 VA and above do not have this energy limiting capability because of the lower impedance of their secondary windings.

For the reasons set forth, it has been generally accepted that recycling circuit breakers cannot be incorporated in control transformers having relatively high power ratings, particularly in the range of 40-80 VA.

Accordingly, one object of the present invention is to provide the benefits and advantages of recycling circuit breakers in control transformers having relatively high power ratings and more specifically in the range of 40-80 VA.

Another, and broader, object of the present invention is to minimize, if not eliminate the need for replacing transformers where there is a short circuit, or overload, in the secondary load circuit thereof.

A further object of the present invention is to attain the foregoing ends in compliance with existing safety codes and standards.

Yet another object of the present invention is to provide a higher power rated transformer which is energy limiting when there is a short circuit in its secondary load circuit.

These ends are attained by a transformer which is automatically capable of reuse after an overload or short circuit. The transformer comprises a primary winding adapted to be connected across an electrical power source and a secondary winding electromagnetically coupled to the primary winding and across which an electric load is to be connected. Each of the windings comprises a plurality of turns of an electrical conductor and insulation separating the turns. The insulation has a degradation temperature above which its dielectric characteristic becomes ineffective.

Pursuant to the present invention a recycling circuit breaker is connected in series with one of the windings, preferably the secondary winding, and mounted thereon to reflect, or indirectly sense, the temperature of the winding and particularly its insulation. The circuit breaker is actuated from a closed position to an open position upon reaching a temperature approaching, but less than, the insulation's degradation temperature.

The impedance of the secondary winding is insufficient to limit current in the winding on which the circuit breaker is mounted to a level at which the circuit breaker will be actuated before the insulation reaches its degradation temperature, upon the occurrence of a short in the secondary. In order to so limit current flow and obtain actuation of the circuit breaker before degradation of the insulation, the transformer includes means for creating a flux loss impedance in the coupling between the primary and secondary windings. The effect is a purposeful decoupling of the transformer windings.

This transformer preferably includes a thermal fuse connected in series with and mounted on the primary winding to reflect the temperature thereof and particularly its insulation. The thermal fuse is actuated to an open condition upon reaching a temperature higher than that reached when the recycling circuit breaker is actuated. Thus protection is provided against short circuit current flow in the event the circuit breaker fails in a closed position.

Transformers of the present invention preferably have power ratings ranging from about 40 VA to about 75 volt/amp. They may further comprise a core for electromagnetically coupling the primary and secondary windings, the primary and secondary windings being disposed in side by side relation on the core. The means for creating the necessary flux loss impedance then include means spacing the windings apart a distance greater than about 0.040 in. and preferably about 0.090 in.

Transformers of the present invention are preferably energy limiting in order to protect the electrical components of the load circuit in the event of a failure of the circuit breaker in a closed position when a short circuit occurs. Thus, the insulation for the secondary winding may be a thermoplastic resin which degrades by melting and permits turns of the secondary to short, thereby reducing the effective number of turns in the secondary winding and the current flow therethrough. The degradation temperature of the insulation for the secondary winding is substantially less than the actuation temperature for said thermal fuse. Thus, in the event of a failure of the recycling circuit breaker in a closed condition, the secondary insulation will melt and secondary current flow will be reduced in a shorter time than required for actuation of the thermal fuse when a short occurs in the secondary.

Preferably, the actuation temperature for the recycling circuit breaker is a relatively small number of degrees less than the degradation temperature of the insulation for the secondary winding and the degradation temperature of the insulation for the secondary winding is a relatively small number of degrees above its continuous duty operating temperature. Also, the degradation temperature of the insulation for the secondary winding is substantially less than the actuation temperature for said thermal fuse. Thus, in the event of a failure of the recycling circuit breaker in a closed condition, the secondary insulation will melt and current therethrough will be reduced in a shorter time than required for actuation of the thermal fuse when a short occurs in the secondary.

The controlled failure mode of the transformer, through melting of the insulation for the secondary winding also finds utility in providing the energy limiting feature for transformers having thermal fuses as the sole means of short circuit protection.

Other preferred features are found in the combined impedance of the winding and flux loss impedance being, approximately, the minimum required to permit actuation of the recycling circuit breaker before the secondary insulation reaches its degradation temperature. Further, the current flow resulting from such combined impedances is high enough to cause sufficient degradation of the insulation for the secondary winding to reduce secondary current flow to eight amp. within one minute of the occurrence of a short circuit in the secondary, in the event of a failure of the circuit breaker in its closed position.

An alternate means for creating the desired flux loss impedance is through the use of shunt means, preferably formed by ferrous core lamination pieces of correct dimensions disposed between the windings when they are in side by side relation.

Another feature of the invention provides energy limiting protection by limiting short circuit current so that it never exceeds a level which would damage the components of an electrical load circuit. This is a problem which can arise in the use of a thermal fuse as a protective device whether or not used in combination with a recycling circuit breaker.

This end is attained by increasing the flux loss impedance to a point where secondary current flow does not exceed the desired level, preferably eight amp. Such end is facilitated by the use of shunt means.

The above and other related objects and features of the invention, including specific temperature relationships, will be apparent from a reading of the following description of preferred embodiments, with reference to the accompanying drawing, and the novelty thereof pointed out in the appended claims.

In the drawing:

FIG. 1 is a front view, partially in section, of a transformer embodying the present invention;

FIG. 2 is a section taken on line 2—2 in FIG. 1;

FIG. 3 is a fragmentary section, on an enlarged scale, also taken on line 2—2 in FIG. 1;

FIG. 4 is an electrical schematic of the transformer seen in FIGS. 1-3;

FIG. 5 is an a front view, partially in section, of a transformer incorporating another embodiment of the present invention;

FIG. 6 is a section taken on line 6—6 in FIG. 5;

FIG. 7 is an electrical schematic of the transformer seen in FIGS. 5 and 6;

FIG. 8 is a diagram illustrating short circuit current flow in different transformers;

FIG. 9 is a diagram illustrating the relationship between short circuit current flow and winding temperature in a conventional transformer;

Figure 10:
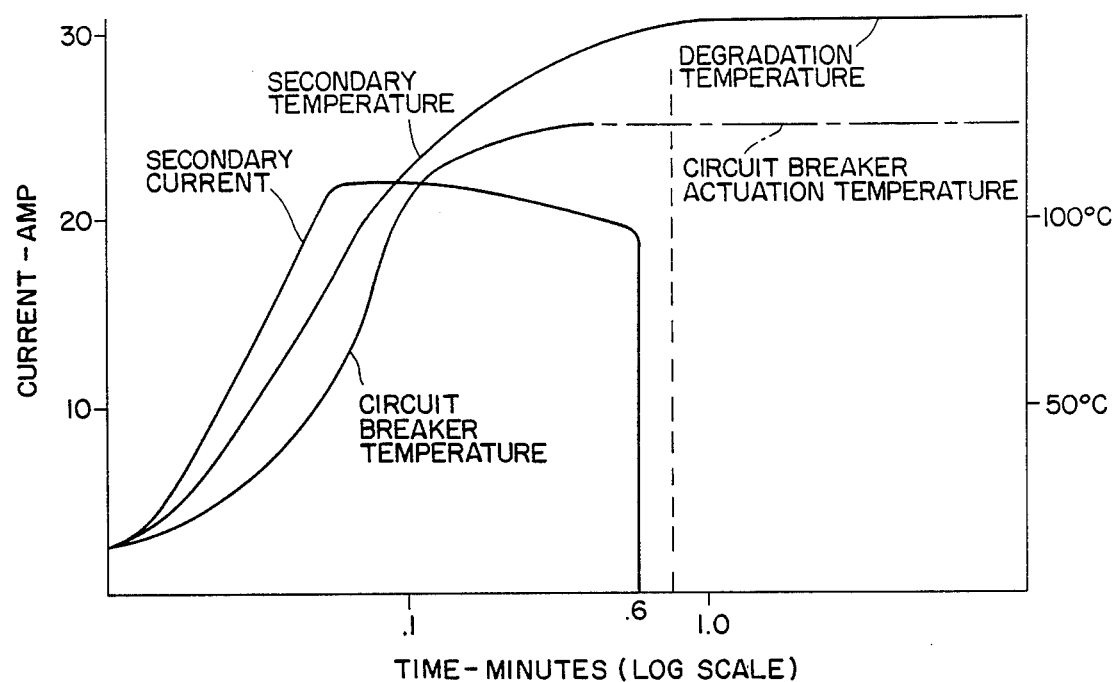
FIG. 10 is a diagram illustrating the relationship between short circuit current flow and winding temperature in the present transformer.

It will first be noted that the transformer manufacture is a mature art. As such, design parameters for windings and cores may be readily established by one skilled in the art to provide transformers having desired operating characteristics such as input voltage, output voltage, power ratings, output voltage regulation and so forth.

Referencing FIGS. 1 and 2, a transformer, indicated generally by reference character 10, comprises a primary winding, or coil 12 having leads 14, 16 for connection with a power source (see also FIG. 4) and a secondary winding, or coil, 18 having leads 20, 22 across which the control circuit load is connected. The windings 12 and 18 are coupled by a core 24 which is mounted with a frame 26. Flanges 28 at the base of the frame 26 have holes 30 to facilitate mounting of the transformer on a control panel or the like.

The core 24 is formed of EI, ferrous, core metal laminates. The windings 12 and 18 are wound on a bobbin 32 formed of dielectric material and have a central opening which receives the central bar of the core 24. Conventional wire is employed in forming the windings, this being copper wire coated with a thermoplastic, resinous dielectric material, which insulates the turns of the winding one from another. The bobbin 32 has end flanges 34 and a central flange 36 which spaces the windings 12 and 18.

The transformer 10, pursuant to the use of known design parameters, has a 60 VA power rating at a 24 volt potential across the output of the secondary winding 18, drawing 2.5 amp., with an input potential of 240 volts across the primary winding 12.

A fuse 38 is connected in series of the primary winding 12 and a circuit breaker is connected in series with the secondary winding 18.

The fuse 38 is a temperature responsive, thermal fuse having a fusible element which melts to interrupt current flow when its temperature reaches a rated value. For the present 60 VA transformer, a temperature rating of 150° C. is satisfactory for the fuse 38, which may also be referenced as a one shot fuse.

The circuit breaker 40 is a recycling, temperature responsive circuit breaker comprising a bimetallic element which has contacts that are in closed position below a given, rated temperature. When the rated temperature is exceeded, the bimetallic element flexes to open these contacts and interrupt current flow so long as the rated temperature is exceeded. When the temperature of the bimetallic element is reduced below the rated temperature, the bimetallic element automatically flexes back to the closed position, hence the term "recycling". A satisfactory temperature rating for the circuit breaker 40 is 125° C.

Recycling circuit breakers are commercially available devices. An exemplary circuit breaker meeting the present requirements is Klixon Type No. 7AM032B5, available from Texas Instrument Company.

The temperature ratings for the fuse 38 and circuit breaker 40 are selected so that insulation of the respecting windings 12 and 18 will not be degraded and their dielectric properties compromised. It is to be noted that the actual insulation temperatures can be higher than these rated values due to a time lag in the circuit breaker sensing winding temperature, nonetheless, the selected temperature ratings are adequate to protect against insulation degradation.

At this point it will be noted that transformer wiring is commercially available in a fairly wide range of temperature ratings for continuous duty operation. Operation of a transformer with the winding wire above its rated temperature results in degradation of the wire's insulation. The degree to which the rated temperature is exceeded and the time of overtemperaturing provide a combined affect as to the extent of degradation. For many types of insulation, a small excursion above the rated temperature will result only in a small reduction in the useful life of the insulation. On the other hand temperatures substantially in excess of the rated temperature can quickly result in loss of the insulation's dielectric property. For purposes of the present invention, degradation temperature references a temperature slightly above the continuous duty operating temperature at which the significant deterioration of the insulation occurs.

The fuse 38 is mounted on the surface of the primary winding 12 (FIG. 2) so that it will sense and be responsive to the temperature of that winding. The circuit breaker is mounted on the surface of the secondary winding 18 so that it will sense and be responsive to the temperature of that winding. A thin dielectric sheet 42 may be interposed between the secondary winding 18 and the circuit breaker 40 and a similar sheet interposed between the fuse 38 and the primary winding 12 to provide further protection for these windings.

A casing 44 encloses the windings 12 and 18, the fuse 38 and the circuit breaker 40. The casing 44 may be formed of one or more layers of adhesive, dielectric tape wound around the windings and adhered to the flanges of the bobbin. In addition to providing protection for the windings 12 and 18, the casing 44 provides the necessary barrier to access to the fuse 38 and circuit breaker 40 so that they cannot be tampered with and their protective functions bypassed or otherwise defeated.

The transformer 10, in normal operation functions as a conventional transformer in energizing a load circuit across the secondary winding 18, providing power within its 60 VA rating at 24 volts and 2.5 amp.

When a short circuit or overload occurs in the secondary load, current flow in excess of 2.5 amp. will increase the temperature of the winding 18 above 125° C., thus actuating the circuit breaker 40 to interrupt current flow. By this interruption of current flow, the insulation of winding 18 is protected from degradation. Likewise the interruption in current flow in the secondary prevents further current from being drawn by the primary winding 12 and prevents degradation of its insulation.

The transformer is, thus, preserved in an operable condition despite the occurrence of the short circuit. When the secondary winding, and the circuit breaker 40, cool below 125° C., the circuit breaker contacts close and current flow through the secondary load circuit is reestablished. If the cause of the short circuit, or overload has been corrected, circuit operation will continue in a normal fashion. If the cause has not been cured, the circuit breaker will again be actuated. Cycling of the circuit breaker will continue until the cause of the short circuit, or overload is corrected, or until the circuit breaker fails.

The described operation of the present transformer would not be obtained by simply connecting a recycling circuit breaker in series with the secondary winding of a conventional, 60 VA transformer.

Referencing FIG. 8, curve A illustrates that, upon the occurrence of a short circuit in a conventional 60 VA transformer, secondary current rises rapidly, if not instantaneously, to a level of 29 amp. This current limit is established by the impedance of the secondary winding and the flux loss impedance between the windings.

FIG. 9 illustrates secondary current flow (curve A) and secondary temperature in the same conventional 60 VA transformer in which a recycling circuit breaker has been mounted on the secondary in the same fashion as taught herein. It will be seen that because of the high level of current flow (29 amp.), the secondary winding rapidly exceeds the 130° C. degradation temperature by a substantial amount before the circuit breaker, and more specifically its bimetallic element, reaches its actuation temperature.

The result is that the secondary winding insulation exceeds its degradation temperature before the circuit breaker is actuated. Thus, the occurrence of a short circuit in the secondary circuit in a conventional 60 VA transformer results in its being unsuitable for further use where it is attempted to employ a recycling circuit breaker as a protective device.

The capability of the present transformer to be protected by the recycling circuit breaker 40 is found in a purposeful decoupling of the primary winding 12 and secondary winding 18. Positively stated, the decoupling means create a flux loss impedance which limits secondary current flow. The means whereby decoupling is achieved are discussed below, however, the benefits of decoupling are illustrated in FIGS. 8 and 10.

FIG. 8 also illustrates secondary current flow, on a time basis, subsequent to a short circuit in the secondary. Curve B illustrates secondary current flow in the transformer 10. By decoupling the windings 12 and 18, the flux loss impedance is increased. This increase decreases the rate of current flow increase and further limits the maximum, secondary current flow to 22 amp. (The subsequent decrease in current flow will be later explained.)

FIG. 10 illustrates, on a time basis, parameters of the transformer 10, subsequent to a short circuit in the secondary. Secondary current is the same as curve B in FIG. 8. The temperature of the secondary winding insulation again increases rapidly, but at a somewhat lower rate and to a lower maximum value than for a conventional transformer, because of the decoupling of the windings. With a lower rate of increase as well as a lower maximum temperature, the time lag for the circuit breaker to sense the actual temperature of the secondary is reduced to the point where the circuit breaker will be actuated before the insulation reaches its degradation temperature. Thus the circuit breaker 40 is able to maintain the transformer 10 fully functional in the event there are single or repeated short circuits in the secondary.

To summarize, the operating characteristics of certain transformers, exemplified by relatively high wattage control transformers, specifically illustrated by the 60 VA transformer, require a secondary winding having a relatively low impedance. These low winding impedances are insufficient to limit current flow in the secondary to a level at which the circuit breaker is actuated before the insulation reaches its degradation temperature. In order to enable actuation of the circuit breaker before the insulation reaches its degradation temperature, there is a purposeful decoupling of the transformer windings. This provides means for creating a flux loss impedance that limits current flow to such a level that the temperature of the secondary winding increases at a rate permitting the circuit breaker to be actuated before the degradation temperature is exceeded, upon the occurrence of a short in the secondary.

For a given transformer the dynamic, thermal characteristics are complex. Any calculation of winding temperatures and circuit breaker actuation temperatures, as related to short circuit current flow and flux loss impedance (decoupling) is necessarily based on empirically derived constants unique to a given transformer design and a given circuit breaker. Further, it will be noted that there is no simple expression for, and no easy measurement for the degree of electromagnet coupling between transformer coils.

The greatest degree of electromagnetic coupling is obtained by concentrically primary and secondary windings. Other considerations, however, dictate the use of windings in side by side relation, as herein shown. The degree of electromagnetic coupling is inversely proportional to the square of distance between side by side windings. The conventional sense is to minimize flux loss impedance by minimizing the distance between windings, consistent with the need to provide insulation therebetween. It is generally accepted, in transformers of the present type, that this spacing should be in the order of 0.040 in. This was the winding spacing in the conventional transformer from which the secondary current curve (A) in FIGS. 8 and 9 was derived.

It has been found that the desired decoupling for the 60 VA transformer of the present invention is approximately 0.090 in. This spacing provides the necessary flux loss impedance to limit current flow as illustrated in FIG. 10. This spacing is advantageously provided by forming the central bobbin flange 36 with a thickness of 0.090 in.

The actual spacing required to decouple windings sufficiently to enable sensing of an over current condition must be empirically determined. This is to say that the operating characteristics and design details of a given transformer will determine its maximum, short circuit, current flow. By testing a given transformer with different spacings between its windings, it is possible to establish the minimum spacing which reduces maximum short circuit current flow to a level where a recycling circuit breaker will be actuated before the temperature of the secondary insulation reaches a degradation level.

In practice, this procedure can be more complicated in that, when the windings are decoupled, the output voltage will be reduced and require an increase in the number of turns in the secondary winding. In any event, it is within the abilities of one skilled in the art to modify a conventional transformer to obtain the necessary decoupling, i.e., increased flux loss impedance, while maintaining the desired output potential for a given power rating.

Decoupling of the transformer windings introduces a further problem in that it can effect output voltage regulation. This is to say that the potential across the output of a secondary winding is greater at a no load condition than at the full load condition at which it is rated, the differential being the regulation. Particular where narrow regulation is a requirement, it is preferred that the spacing between the windings 12 and 18 be set at the minimum which will enable the circuit breaker to be actuated before the temperature rise in the secondary winding is sufficient to cause insulation degradation.

It is to be remembered that the degree of decoupling and the increase in flux loss impedance are inversely proportional to the square of the distance between the primary and secondary windings. Thus, a given increase in spacing beyond the generally accepted 0.040 in. spacing does not necessarily serve the purposes of the present invention, unless the resultant flux loss impedance limits current flow to assure actuation of the circuit breaker prior to the insulation reaching its degradation temperature.

Generally speaking, in control transformers having power ratings of about 40 volt amp. or less, the impedance of the secondary winding is sufficiently high to limit short circuit current flow to a level permitting actuation of a circuit breaker before the insulation's degradation temperature is reached, without requiring a decoupling of the windings. The provision of means for increasing flux loss impedance above its conventional level is required only in transformers having power ratings of more than about 40 VA, in order to obtain the benefits of a recycling circuit breaker. In so called control transformers the upper limit of power ratings is about 75 VA, this being the preferred range of power ratings for transformers of the present invention. Reference is again made to the mode of operation of the circuit breaker 40. When a short circuit occurs in the secondary, the circuit breaker opens before the insulation reaches its degradation temperature, thereby preserving its integrity. Upon interruption of current flow, the secondary winding will cool and the circuit breaker will close. If the cause of the short has not been corrected, excess current flow will again actuate the circuit breaker. The circuit breaker will continue to cycle until the cause of the short circuit has been corrected, or until there is a mechanical failure in the circuit breaker.

Recycling circuit breakers are available which have the capability of continuous cycling for a minimum of fifteen days and are preferably employed herein. However, it must be presumed that after some number of cycles the circuit breaker will fail and fail in a closed position wherein there is no protection against excess current flow through the secondary.

This protection is provided by the fuse 38 which is in series with the primary winding 12. The fuse 38 is actuated only when the circuit breaker fails in a closed position. Thus its actuation temperature is set to be responsive to an energy level in the primary winding 12 which is in excess of the energy level necessary to actuate the circuit breaker. In the exemplary embodiment this temperature is established as 150° C., being below the degradation temperature of 180° C. for the insulation for the primary winding and above the temperature which that winding reaches when the circuit breaker is actuated by short circuit current flow in the secondary.

At this point reference is again made to the safety codes referenced above, which require that the a transformer be energy limiting when circuit breakers are used as a protective device. The purpose of limiting energy is to minimize, if not prevent, damage to electrical components comprising the secondary load circuit. The referenced code requires, as an energy limit, that current flow in the secondary not exceed eight amp. at the end of one minute from the occurrence of a short circuit.

The problem now being addressed is also found in conventional transformers protected by thermal fuses in that short circuit current flow continues at a relatively high level for a substantial length of time. Regulatory codes have not, as yet, imposed a corresponding energy limiting requirement on transformers which are protected with thermal fuses, but do not, additionally, include circuit breaker protection.

Figure 11:
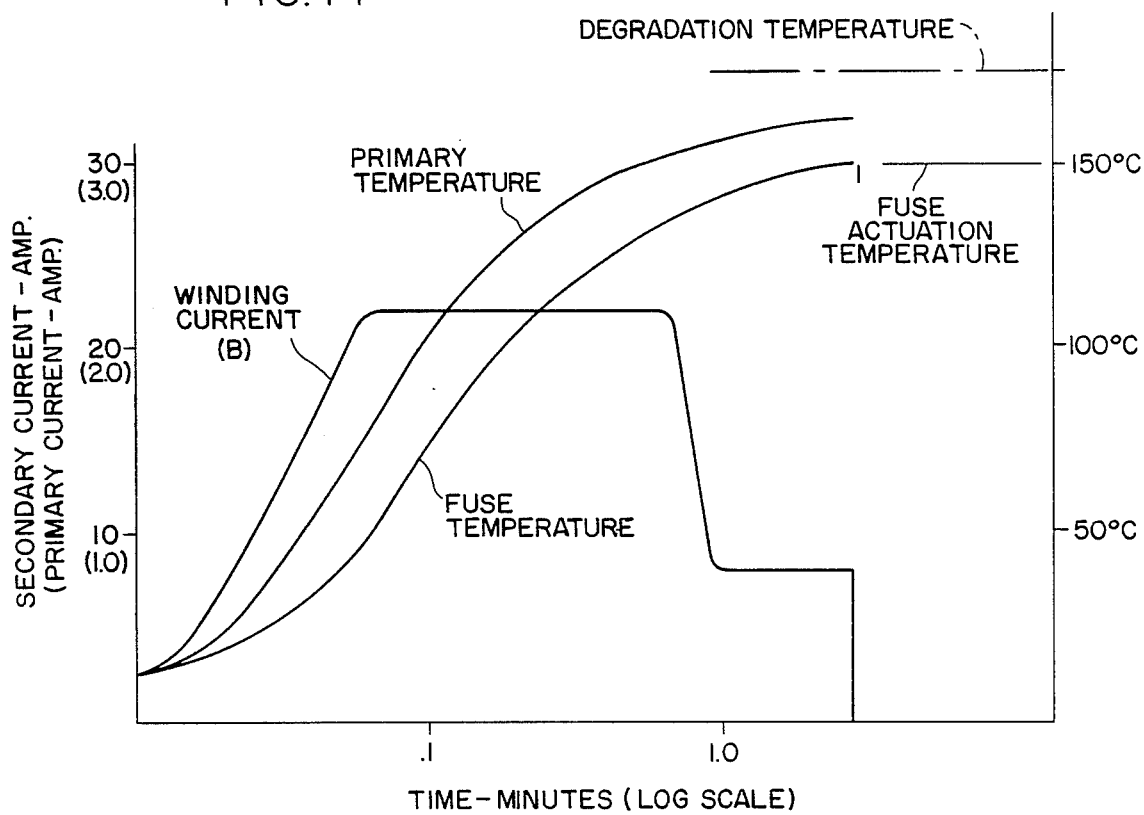
FIG. 11 is a diagram illustrating an energy limiting feature of the present invention.

FIG. 11 illustrates the energy limiting means provided herein. Current flow in the primary and secondary windings is illustrated by a single curve, primary current flow being approximately one tenth that of secondary current. It will be seen that approximately three minutes are required for actuation of the thermal fuse. If secondary current flow continued at the 22 amp. level to which it is limited by its impedance and the flux loss impedance, the eight amp. limit would be exceeded subsequent to the one minute limitation. Such an overcurrent condition is avoided by sharply decreasing secondary current flow to the eight amp. limit immediately prior to the end of the one minute period. Current flow in the primary winding is proportionately reduced. Continued current flow at these reduced levels then actuates the thermal fuse before the insulation for the primary winding reaches its degradation temperature.

This reduction in secondary current flow is attained through a controlled failure mode for the secondary winding. More specifically, the insulation for the secondary winding 18 is selected as a thermoplastic resin which will melt and permit contact between adjacent turns when the degradation temperature is exceeded.

The turns are thus shorted to reduce current flow below the eight amp. limit. As previously noted the degradation temperature of the insulation for the secondary winding is also approximately its continuous duty operating temperature. The insulation for the wire of the secondary winding is selected so that when the rated temperature is exceeded by a relatively few degrees, melting (degradation) of the insulation occurs very rapidly.

Commercially available, insulated transformer winding wire, properly selected, will enable the attainment of this controlled failure mode. The preferred insulation for the secondary winding is a polyurethane resin having a nylon overcoat with a continuous duty temperature rating of 130° C. The melting, or degradation, temperature is only a few degrees above that temperature. Thus, where there is a failure of the circuit breaker in the closed position, continued current flow in the secondary raises the insulation temperature to the melting temperature, the turns in the winding short, reducing the effective number of turns and thus reducing current flow below the eight amp. limit within the one minute time period.

It is to be recognized that there is an interrelationship between the rate of temperature increase in the secondary, the degradation temperature and the actuation temperature for the circuit breaker 40, all of which are related to secondary current flow.

In FIG. 10 it will be seen that the secondary reaches the degradation temperature of its insulation at about 0.8 minutes after the occurrence of a short circuit. In order for the circuit breaker to be effective in preserving the integrity of the transformer, it is necessary that the circuit breaker reach its actuation temperature in a period of less than 0.8 minutes. Referencing FIG. 10 again, it will be seen that the actuation temperature is sensed and secondary current flow interrupted at about 0.6 minute after occurrence of a short circuit.

It will also be apparent that the controlled failure mode, wherein the secondary insulation melts to limit energy, can also be applied to other transformers where it is desired to employ thermal fuses as a means of short circuit protection, without also employing a recycling circuit breaker.

In the preceding discussion, reference has been made to a short circuit in the secondary load circuit as being the failure mode which triggers actuation of the circuit breaker 40 and the energy limiting failure mode of the secondary winding in providing transformer protection. Actually, these protective features are responsive to any energy overloads, with a short circuit being the extreme overload condition. Thus, any current flow in excess of the rated current (2.5 amp.), if continued for a sufficient period of time, will result in sufficient heat being generated to actuate the circuit breaker 40. The circuit breaker will however, be non-responsive to brief excursions in current above the 2.5 amp rating, thus accommodating "normal transient overloads" which do not necessarily reflect a circuit malfunction.

It is also to be appreciated that ambient temperature affects operation of these protective features. Thus, the absolute temperature of both the primary and secondary insulation is a function of both ambient temperature and current flow. Thus at high ambient temperatures, even the impedance temperature rise incident to normal, or rated, current flow can increase the temperature of the secondary winding sufficiently to actuate the circuit breaker 40. The integrity of the insulation of the transformer windings is thus protected so long as the ambient temperature does not exceed the degradation temperature of the insulation.

The latter feature can be of importance in air conditioner controls where ambient temperature can temporarily exceed 130° C. With conventional, current fuse protected transformers, in all likelihood, at high ambient temperature, normal current flow will cause the degradation temperature to be exceeded, but the fuse will not be actuated until there is a short circuit in either one or the other of the windings and the transformer would no longer be operable. With transformers of the present invention, actuation of the circuit breaker 40 can preserve their operability.

One other point to note is that, preferably, the secondary winding is configured to fail prior to failure of the primary winding. Thus, the melting temperature, or degradation temperature of the primary winding is selected to be higher than the secondary winding, preferably in the order of 180° C. This is of significance in minimizing the shorting of the higher potential, primary voltage to a ground connection.

Reference is next made to FIGS. 5-7 for a description of another transformer, generally indicated by reference character 10'. The transformer 10' comprises components which generally correspond to the components of the transformer 10, which are referenced the same reference characters, but primed, without necessarily being further described.

Thus the transformer 10' comprises a primary winding 12' and a secondary winding 18' coupled by an EI core 24'. In this transformer, a thermal fuse 38' and a thermal, recycling circuit breaker 40' are both connected in series with the primary winding 12'. The fuse 38' and circuit breaker 40' are physically mounted on the primary winding 12' to be responsive to the temperature thereof, and encased within a protective casing 44' in a manner similar to the construction of the transformer 10.

The protective features of the transformer 10' are, in net effect, the same as provided by the transformer 10. That is the circuit breaker 40' is actuated to prevent current flow in the secondary winding 18' causing degradation of its insulation. However, in the present embodiment, through the use of known design parameters, the primary winding is designed to have a higher temperature than the secondary winding, at a given current flow.

Thus by sensing the temperature of the primary winding, the circuit breaker will be actuated prior to degradation of the secondary insulation, as well as prior to degradation of the primary insulation. The flux loss impedance serves to limit current flow in both the primary and secondary windings so that the benefits of increasing flux loss impedance to enable actuation of the circuit breaker 40' prior to the winding degradation temperature being reached are also realized.

Actually, the windings 12' and 18' are decoupled to a substantially greater extent than the windings 12 and 18. This is accomplished by increasing the distance between the windings through the use of a modified bobbin 32' which comprises spaced central flanges 36'. The increased spacing is evident from a comparison of FIGS. 1 and 5.

Further decoupling is provided by shunts 50 disposed between the flanges 36'. The shunts comprise a plurality of ferrous metal plates which serve to introduce a further leakage impedance between the windings 12' and 18'.

This significant decoupling of the primary and secondary windings provides an alternate means for limiting energy. Thus, the electromagnetic coupling between the windings 12' and 18' is reduced to a point where the flux leakage impedance limits current flow, when there is a short circuit in the secondary load, to the maximum permissible for continued operation without creation of a hazard. This is illustrated by curve C in FIG. 8.

It will be noted decoupling to the extent that secondary current flow does not exceed the eight amp. limitation, results in poor output voltage regulation. This restricts the applications for transformers incorporating this feature.

It will be pointed out that the curves, or plots, of FIGS. 8–11 are typical and are intended only to show relative conditions in the sequence at which the circuit breaker and fuse are actuated and their relation to the controlled failure of the secondary winding insulation.

Reference herein has been made to a single primary and a single secondary winding. It will be appreciated that the features of the invention would also be applicable to windings having multiple coils or taps to provide multiple output potentials.

Other variations from the illustrated embodiments will occur to those skilled in the art within the spirit and scope of the present invention as set forth in the following claims.

Having thus described the invention, what is claimed as novel and desired to be secured by Letters Patent of the United States is:

1. A transformer automatically capable of reuse after an overload or short circuit, said transformer comprising
    a primary winding adapted to be connected across an electrical power source,
    a secondary winding electromagnetically coupled to the primary winding and across which an electric load is to be connected,
    each of said windings comprising a plurality of turns of an electrical conductor and insulation separating said turns,
    said insulation having a degradation temperature above which its dielectric characteristic becomes ineffective,
    a recycling circuit breaker connected in series with one of windings and mounted thereon to reflect the temperature of the winding and particularly its insulation, said circuit breaker being actuated from a closed to an open position upon reaching a temperature approaching, but less than, the insulation's degradation temperature,
    the impedance of said secondary winding being insufficient to limit current flow in said one winding to a level at which the circuit breaker will be actuated before the insulation therefor reaches its degradation temperature, upon the occurrence of a short in the secondary, and
    characterized by means for creating a flux loss impedance in the coupling between the primary and secondary windings, which impedance limits the rate of current flow to a level at which the circuit breaker is actuated before the insulation for either winding reaches its degradation temperature, upon the occurrence of a short circuit in the secondary.

2. A transformer as in claim 1 wherein the recycling circuit breaker is mounted on and connected in series with the secondary winding.

3. A transformer as in claim 1 further including
    a thermal fuse connected in series with and mounted on the primary winding to reflect the temperature thereof and particularly the insulation temperature thereof,
    said thermal fuse being actuated to an open condition upon reaching a temperature a level higher than that reached when the recycling circuit breaker is actuated,
    thereby providing protection against short circuit current flow in the event the circuit breaker fails in a closed position.

4. A transformer as in claim 3 wherein
    the recycling circuit breaker is mounted on and connected in series with the secondary winding.

5. A transformer, as in claim 3, having a power rating in the range between about 40 VA and about 75 VA further including
    a core for electromagnetically coupling the primary and secondary windings, and
    wherein
    the primary and secondary windings are disposed in side by side relation on the core, and
    the means for creating said flux loss impedance include means spacing the windings apart a distance greater than about 0.040 in.

6. A transformer as in claim 5 wherein
    the windings are spaced apart about 0.090 in.

7. A transformer as in claim 3 wherein
    the insulation for the secondary winding being a thermoplastic resin which degrades by melting and permits turns of the secondary to short, thereby reducing the effective number of turns in the secondary winding and the current flow therethrough,
    the degradation temperature of the insulation for the secondary winding being substantially less than the actuation temperature for said thermal fuse,
    whereby, in the event of a failure of the recycling circuit breaker in a closed condition, the secondary insulation will melt and secondary current flow will be reduced in a shorter time than required for actuation of the thermal fuse when a short occurs in the secondary.

8. A transformer as in claim 4 wherein
    the actuation temperature for the recycling circuit breaker is a relatively small number of degrees less than the degradation temperature of the insulation for the secondary winding,
    the degradation temperature of the insulation for the secondary winding is a relatively small number of degrees above its continuous duty operating temperature,
    the insulation for the secondary winding being a thermoplastic resin which degrades by melting and permits turns of the secondary to short, thereby reducing the effective number of turns in the secondary winding and the current flow therethrough,
    the degradation temperature of the insulation for the secondary winding being substantially less than the actuation temperature for said thermal fuse,
    whereby, in the event of a failure of the recycling circuit breaker in a closed condition, the secondary insulation will melt and current therethrough will be reduced in a shorter time than required for actuation of the thermal fuse when a short occurs in the secondary.

9. A transformer as in claim 8 wherein
the combined impedance of the winding and flux loss impedance is approximately the minimum required to permit actuation of the recycling circuit breaker before the secondary insulation reaches its degradation temperature, and
the current flow resulting from such combined impedances is high enough to cause sufficient degradation of the insulation for the secondary winding to reduce secondary current flow to eight amp. within one minute of the occurrence of a short circuit in the secondary, in the event of a failure of the circuit breaker in its closed position.

10. A transformer, as in claim 9, having a power rating in the range between about 40 VA and about 75 VA further including
a core for electromagnetically connecting the primary and secondary windings, and
wherein
the primary and secondary windings are disposed in side by side relation on the core, and
the means for creating said flux loss impedance include means spacing the windings apart a distance greater than about 0.040 in.

11. A transformer as in claim 9 further including
a bobbin on which the primary and secondary windings are wound and having a central flange on which spaces the windings apart a distance of approximately 0.090 in., and
a casing enclosing the windings and the recycling circuit breaker and thermal fuse mounted thereon, to provide means for preventing access thereto, and
wherein
the insulation for the secondary winding is a polyurethane resin having a nylon overcoat.

12. A transformer, as in claim 11, having a power rating of 60 VA wherein
the degradation temperature of the insulation for the primary winding is 180° C., the actuation temperature for the thermal fuse is 150° C., the degradation temperature of the insulation for the secondary winding is 130° C. and the actuation temperature for the recycling circuit breaker is 125° C.

13. A transformer as in claim 1 wherein
the means for creating a flux loss impedance comprise shunt means disposed between the primary and secondary windings.

14. A transformer as in claim 13 wherein
the recycling circuit breaker is mounted on and connected in series with the secondary winding, and further comprising
a thermal fuse connected in series with and mounted on the primary winding to reflect the temperature thereof,
said thermal fuse being actuated to an open condition upon its temperature reaching a level higher than that reached when the recycling circuit breaker is actuated,
thereby providing protection against short circuit current flow in the event the circuit breaker fails in a closed position, and
further wherein
the secondary winding impedance and the flux loss impedance limit secondary current flow to a level which will not damage electrical components of the secondary load circuit.

15. A transformer as in claim 14 further comprising
a core for electromagnetically coupling the primary and secondary windings, and
wherein
the primary and secondary windings are disposed in side by side relation on the core, and
the means for the shunt means include ferrous metal plates disposed between the primary and secondary windings, and
current flow in the secondary is limited to about eight amp. in the event the circuit breaker fails in a closed position, upon the occurrence of a short in the secondary.

16. A transformer in which the energy level of current flow is limited in the event of a short circuit, said transformer comprising
a primary winding adapted to be connected across an electrical power source,
a secondary winding electromagnetically coupled to the primary winding and across which an electric load is to be connected,
each of said windings comprising a plurality of turns of an electrical conductor and insulation separating said turns,
said insulation having a degradation temperature above which its dielectric characteristic becomes ineffective,
a thermal fuse connected in series with the primary winding and mounted thereon to reflect the temperature thereof,
said thermal fuse being actuated to an open condition upon the temperature of the primary winding exceeding a value reflecting a short circuit in the load connected across the secondary winding,
the insulation for the secondary winding being a thermoplastic resin which degrades by melting and permits turns of the secondary to short, thereby reducing the effective number of turns in the secondary winding and the current flow therethrough,
the degradation temperature of the insulation for the secondary winding being substantially less than the actuation temperature for said thermal fuse,
whereby the secondary insulation will melt and current therethrough will be reduced prior to actuation of the thermal fuse.

* * * * *